G. W. HARRIS.
PROCESS OF MANUFACTURING ILLUMINATING AND HEATING GAS.

No. 169,637. Patented Nov. 9, 1875.

Witnesses:

Inventor:
Geo. W. Harris

UNITED STATES PATENT OFFICE.

GEORGE W. HARRIS, OF ELIZABETH, NEW JERSEY.

IMPROVEMENT IN PROCESSES OF MANUFACTURING ILLUMINATING AND HEATING GASES.

Specification forming part of Letters Patent No. 169,637, dated November 9, 1875; application filed October 7, 1875.

*To all whom it may concern:*

Be it known that I, GEORGE W. HARRIS, of the city of Elizabeth, Union county, and State of New Jersey, have invented and made a new and useful Improvement in the Manufacture of Gases for Illuminating and Heating Purposes, of which the following is a specification:

My invention consists in a process of manufacturing illuminating and heating gas from the decomposition of steam and the destructive distillation of wood, the steam being first decomposed in regulated quantities in a highly-heated retort containing carbonaceous material, and the resultant gases carried into a retort at a high temperature, in which the destructive distillation of wood is taking place, the combined gases thus produced being carried into a third retort, and on their way being charged with liquid hydrocarbon, which is converted into vapor by the heated gases, the whole being finally decomposed in a third retort, and converted into permanent gas, as hereinafter more fully set forth.

When petroleum, naphtha, or other oils alone are used, the gas produced is well known to contain an excess of carbon, and to be of too high illuminating power and low specific gravity, and at all times liable to great loss in its manufacture, and afterward from condensation, and is considered an unmerchantable article for general use, or for the purposes of lighting cities or towns.

The effect of my invention is to obviate these difficulties, and to produce a gas of any required illuminating power, which, at the same time, shall not be liable to any loss of carbon in its manufacture, or to any condensation afterward, and by the combinations above mentioned such gases may be produced at a less cost than by any other method hitherto known.

That my improvements may be fully understood I will proceed to explain the manner of producing the different gases, and the mode of uniting them; and, inasmuch as the method of making and uniting the gases produced by the decomposition of steam and the destructive distillation of wood for heating purposes is the same as when made for combination with petroleum, naphtha, or other oils, or with the gas generated from the same for illuminating purposes, I will fully explain the mode and manner of making and combining all of the different gases, by which a perfect illuminating-gas of any required candle-power is produced.

Figure 1:
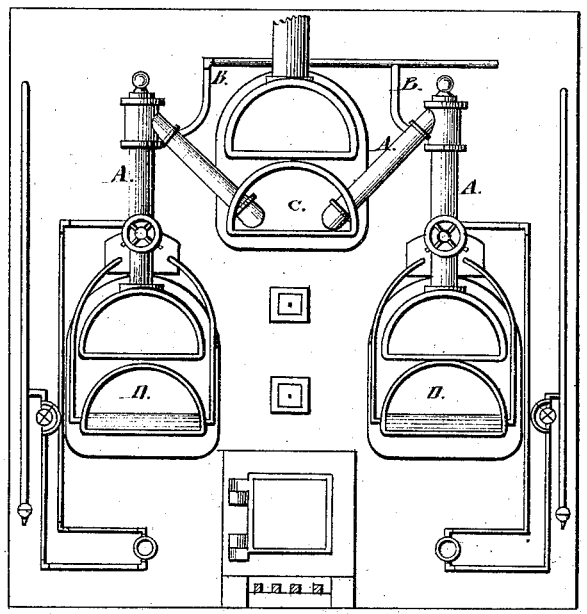

My apparatus, in its best and most perfect form, consists of three double retorts of the best fire-clay materials, arranged in a bench, as shown in Figure 1 on the accompanying drawing, (the said double retort having been heretofore secured to me by Letters Patent of the United States, No. 112,593, and granted to me March 14, 1871,) together with four fire-clay superheaters and two steam-driers, arranged in the same bench, as shown in Fig. 1 on the accompanying drawing. But I am not confined to this specific arrangement, or to the above double retorts, as any other retorts or arrangement of them may be resorted to which will produce similar results—as, where the arches are not of sufficient size to admit of three double retorts and the superheaters, a less number, or a part of double and a part of single retorts, may be used; or, when of sufficient size, a greater number may be used in the same bench. But I prefer the arrangement as described as being preferable, and more effective than any other.

Figure 2:
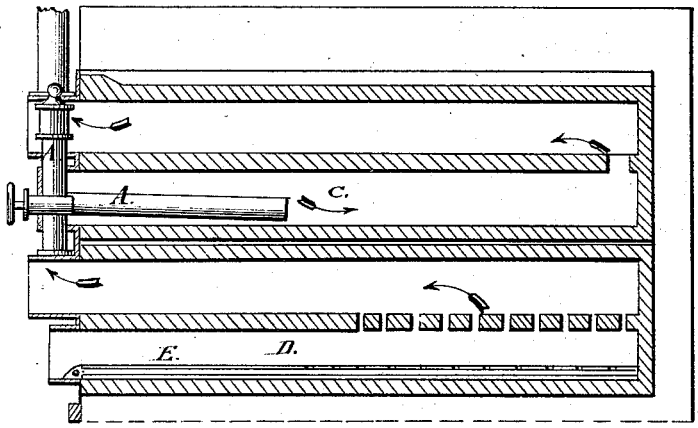

The lower chamber of the two double retorts D has a false bottom, formed by a number of joined and closely-fitted fire-clay tiles, E, as shown in Fig. 2, with flues through them, and forming passages from the front to the rear of the retort. The upper surface of these flues is perforated with small holes for about two-thirds of the length of the retort from the rear end. Through the diaphragm, between the lower and upper chambers of the retort, a number of larger holes are made for about one-half the length of the retort from the rear end, or an opening in the diaphragm at the rear end may be made.

In working the process the lower chamber of the retort D is filled with anthracite coal, coke, or other suitable fixed carbons, and, when incandescent, highly superheated steam, which is under perfect control by means of an index-valve in the pipe, is forced through the flues in the tiles or false bottom of the retort, passes in small jets through the small holes, and is distributed through the incandescent material contained in the lower chamber of the retort, by which means it is decomposed, the hydrogen being set free, and the oxygen uniting with a portion of the carbon of the decomposing material, and forming carbonic oxide. The compound gas thus formed passes through the holes, or any proper opening in the rear part of the diaphragm, into the upper chamber. During the same time, at suitable intervals, this upper chamber is charged with well-seasoned hard wood, the gas from which unites with the water-gas from the lower chamber.

If the gas is desired for fuel or heating purposes only, it is made to pass from the upper chamber of each retort to the stand-pipe, and thence to the main, and through the condenser and station-meter to the holder provided for that purpose.

If, however, the combined gas is desired for illuminating purposes, it is made to pass from the upper chamber in the lower retort, through the pipe A, into the lower chamber of the upper or third retort C, as shown in Fig. 1.

Through the small pipe B, and controlled by suitable valves, crude petroleum, naphtha, or other oil is allowed to enter the pipe A near the upper retort, in such quantity as is found, by a view of the gas-flame, or more accurately by a photometer, to be necessary to make the gas of the required illuminating power.

The combined water and wood gases being very hot as they pass from the lower to the upper retort, the oil, upon coming in contact with the same in pipe A, is thoroughly vaporized, and the vapors are mingled with and enveloped by the gases, and carried in by pipe A at the front of the lower chamber of the upper retort C, and back through the same to the holes or an opening in the rear end of the diaphragm, and up through the same into the upper chamber, and thence to the front of the retort, and up through the stand-pipe to the main or other desired exit, by which process the oil-vapors are all converted into gas, and all the gases are chemically combined and mingled together, and formed into a perfect gas of any required illuminating power. The combined water and wood gases, thus enveloping the oil-vapors, carry them through retort C at a very high heat, and prevent any of the carbons from being burned to cinders.

This combination of the water and wood gases acts beneficially upon each other, and obviates certain difficulties and objections existing when used separately or alone, in conjunction with petroleum and other hydrocarbons, the water-gas destroying or overcoming the injurious effect of the pyroligneous acid and other impurities in the gas produced from the destructive distillation of wood.

In the above-described process for the manufacture of illuminating-gas I prefer to have a tank containing the petroleum, naphtha, or or other oils elevated at a sufficient height to cause the oil to run by gravitation through the feeding-pipe B into the upper retort C; but any other convenient mode for supplying the oil through the feeding-pipe B may be used.

In the feeding-pipe B, between the oil-tank and the bench, and placed in a proper and safe position, where it can readily be seen, I insert a glass tube, about six or eight inches in length, and sealed in, and forming a section of said pipe, for the purpose of showing at a glance the running of the oil and the size of the stream as it leaves the valve or stop-cock placed in the pipe directly above the glass tube, for the greater certainty and regularity of the operation.

After the perfected illuminating-gas produced by the combinations aforesaid has passed through the stand-pipe it is sent in the ordinary way as coal-gas through the main, condenser, purifier, and station-meter, and thence to the holder.

To produce the above-mentioned or similar results the retorts used for the perfecting of the illuminating-gas may be placed in a separate bench, or in any other convenient form.

I claim—

The process of manufacturing gas for heating and illuminating purposes, by decomposing steam in a highly-heated retort by means of carbonaceous material, conducting the resultant gases into a retort at a high temperature, containing wood undergoing destructive distillation, and combining the water-gas with the wood-gas in a nascent state, and conducting the gases into a third retort, combining with the same on their way thereto vapor from liquid hydrocarbon, and finally converting the combined gases and vapors in said retort into a permanent gas, substantially as and for the purposes herein described.

GEO. W. HARRIS.

Witnesses:
H. P. ALLEN,
AUG. H. ALLEN.